Patented June 29, 1943

2,322,940

UNITED STATES PATENT OFFICE 2,322,940

SOURING MATERIAL

George William Kirby, Yonkers, Marvin Helmar Rasmussen, Brooklyn, and Stanley Adolphus McHugh, Bronx, N. Y., assignors to Standard Brands Incorporated, New York, N. Y., a corporation of Delaware No Drawing. Application March 12, 1940,
Serial No. 323,532

10 Claims. (Cl. 99—91)

The invention relates to a process for the manufacture of a souring material, and to the resultant product. More particularly, it pertains to the production of a souring material suitable for use in the preparation of baked goods, and includes correlated improvements and discoveries whereby properties of the souring material are enhanced and maintained.

It is an object of the invention to provide a procedure for the production of a souring material which does not deleteriously affect the active organism and yields a product of uniform nature.

Another object of the invention is the provision of a process which is practicable and workable to a desired extent with attending simplicity, economy and efficacy of operation.

A further object of the invention is to provide a process for preparing a dry souring material which is stable and hence retains its activity until utilized by the consumer.

An additional object of the invention is to provide a procedure for the production of a dry rye souring material containing lactic acid bacteria and a conditioned farinaceous material, e. g., rye flour with or without a shortening material, and a flavor.

A particular object of the invention is to provide as a composition of matter a dry souring material containing pure cultured moderate temperature lactic acid-forming bacteria, which is well adapted for making sour rye breads.

A specific object of the invention is the provision of a composition of matter which comprises a dry souring material containing lactic acid-forming bacteria, a shortening material, conditioned rye flour, and flavor.

Other objects of the invention will in part be obvious and will in part appear hereinafter.

The invention accordingly comprises the several steps and the relation of one or more of such steps with respect to each of the others, and the composition possessing the features, properties, and the relation of constituents, which are exemplified in the following detailed disclosure, and the scope of the invention will be indicated in the claims.

In the practice of the invention, a souring material may be produced by preparing a nutrient medium or wort, inoculating the same with acid-forming bacteria, e. g. acetic, propionic and lactic acid formers, more especially moderate temperature lactic acid-forming bacteria, which may belong to the subgenus *Beta bacterium* such as the *Lacto bacilli brevis; buchneri; pastorianus* and *fermenti*, allowing the inoculated medium to remain at incubating temperature for a period of time, and following separation of liquid the bacteria may be admixed with a conditioned flour belonging to the group consisting of cereal flours, and legume flours.

It is to be noted that bacilli of the subgenus *Beta bacterium* produce acetic as well as lactic acid. When a souring material containing propionic acid is desired use may be made of *propionibacterium*, for example, *thoenii* and *technicum*. The nutrient material may contain an extract of malt and an extract of malt sprouts, and the concentration thereof may be about 1 to 2° Balling, so that acidification does not develop to an extent which will deleteriously affect the organism during subsequent processing. Inoculation of the nutrient medium may be effected at a suitable pH value. Further, during growth of the organism or at the end of the growing period, a neutralization may be accomplished in order to overcome any deleterious acidity that may have developed. This may be brought about through the addition of an antiacid, as a carbonate of sodium, potassium, calcium and magnesium.

The pH value of the medium may be adjusted to about 6.0, and the medium, after sterilization, is inoculated with suitable lactic acid-forming bacteria. The medium is then permitted to remain at incubating temperature, which may be from 20 to 35° C., and specifically about 30° C., for a period of time which may be in the neighborhood of about 72 hours, whereupon bacteria are separated from liquid, as by means of a centrifuge. The bacteria thus obtained may now be admixed with a flour conditioned to a moisture content upwards to 6%, as a rye flour having a moisture content of about 5%. Further, the bacteria may be admixed first with a shortening material, as a hydrogenated oil, and then with an amylaceous material, as a conditioned rye flour, for example, a dark rye flour having a moisture content of from 4 to 6%.

There may also be introduced into the admixture a flavoring material which may be compounded from caraway seeds, garlic and onions. After incorporating the materials so obtained with a further quantity of rye flour and a flavor, for example, ground caraway seed, the souring material in dried form may be placed in containers which are air-tight and moistureproof. When so packaged and kept at a relatively low temperature the acid-forming bacteria retain their activity for extended periods.

Two primary features of the invention are a careful adjustment of the pH value of the nutrient medium to about 6.0 and utilization of a flour having a moisture content which does not exceed 6%. Adjustment of the pH value provides a medium which obviates an undue development of acidity, and leads to obtainment of a mass following growth of the organism which has a titratable acidity of about 2.5 to 3.2 cc. of $\frac{1}{10}$ normal alkali for each 10 cc. of the medium. Utilization of a flour having not more than 6% moisture is of significance inasmuch as when this value is exceeded the souring material rapidly loses its activity.

As an illustrative embodiment of a manner in which the dry souring material may be produced, the following description is presented:

Utilization may be made of cultured moderate temperature lactic acid-forming bacteria which have been maintained in tubes containing a malt medium having a concentration of about 10° B., and an acidity represented by a pH value of about 5. Such a malt medium contained in a suitable receptacle is inoculated with the lactic acid-forming bacteria and retained at a temperature of about 30° C. for about 24 hours (which initial stage may be referred to as the A stage). A medium prepared from a malt and malt sprouts may now be inoculated with the bacteria grown during the A stage, and the medium kept at a temperature of 30° C. for 24 hours (B stage).

A further quantity of the malt-containing medium is then inoculated with the bacteria grown during the B stage, with retention of temperature at about 30° C. for about 48 hours (C stage). A nutrient medium may now be prepared which contains in 4.8 gallons one pound of malt extract having a Lintner value of 60°, and an extract produced from 0.1 pound of malt sprouts. The acidity of the medium is carefully adjusted to a pH value of about 6.0, whereupon the medium is sterilized and then inoculated with the lactic acid-forming bacteria obtained in the C stage. The action of the bacteria is permitted to take place for 72 hours at a temperature of about 30° C., and with adjustment of the pH value to about 6.0 prior to sterilization the titratable acidity at the end of the 72 hour period will be from 2.5 to 3.2 cc. of $\frac{1}{10}$ normal alkali for each 10 cc. of the medium.

Bacteria are separated from liquid suitably by means of a centrifuge, and the bacterial mass or sludge thus obtained is admixed thoroughly with about one pound of a shortening material which may be a hydrogenated oil, more specifically a hydrogenated cottonseed oil. The mixing may be effected in various manners, but desirably the shortening should be well mixed with the bacterial mass prior to further processing inasmuch as otherwise a tough, dough-like mass which is difficult to handle in subsequent steps might be obtained. When the bacterial mass has been thoroughly mixed with the shortening material, it is then incorporated with dark rye flour having a moisture content of not more than 6%, ground caraway seed, and dehydrated garlic and onions in powdered form. Prior to packaging the dry souring material it is desired to pass it through a sieve of suitable mesh, for example, a U. S. Standard sieve #18. Any lumps remaining on the sieve are broken up and re-sieved, after which it may be re-mixed and made up for marketing with ground caraway seed and dark rye flour in the following approximate respective proportions—7; 12; and 81.

The invention hence entails as features preparation of a nutrient medium which may contain a malt extract, adjustment of pH value to about 6.0, sterilization, inoculation with acid-forming bacteria, incubating at a temperature of about 30° C., removing liquid with concentration of bacteria, immediate transfer thereof to a shortening material or to conditioned flour, or to these materials in conjunction, then mixing the resultant composition with a conditioned flour, either with or without flavors. Souring material so prepared may be packaged in suitable containers which are air-tight and moistureproof, and when maintained at a relatively low temperature activity is retained for considerable periods. At room temperatures the activity remains at a satisfactory level for a period of at least three to six weeks. Other more specific features are that the concentration of the nutrient medium is about 2° B., the incubation temperature about 30° C., and the final pH value about 3.2, with a titratable acidity of 3.

By the foregoing procedure expensive drying steps are obviated, as are also the usual grinding operations which are difficult and time-consuming. Further, the drying procedure neither destroys the acid-forming organisms nor weakens the enzymes so that the product is not of variable and irregular activity, but rather possesses a uniform activity which may be continuously produced in commercial operations.

The dry souring material obtained is well suited for utilization in the manufacture of various types of sour rye bread, such as the typical Jewish sour rye products. Moreover, the moisture content of the final souring material should not be more than 6%, since when a higher moisture content is present the souring material loses its activity rather rapidly. However, the souring material may be used also in the pharmaceutical industry; for introducing acid-forming organisms into soils; for the inoculation of leguminous substance, and makes milk souring organisms available in an active state. This last is of especial interest since compositions previously produced were in a large measure inactive when they reached the consumer.

Since certain changes in carrying out the above process, and certain modifications in the composition which embody the invention may be made without departing from its scope, it is intended that all matter contained in the above description shall be interpreted as illustrative and not in a limiting sense.

Having described our invention, what we claim as new and desire to secure by Letters Patent is:

1. A process for the manufacture of a souring material, which comprises preparing a nutrient medium, inoculating with acid-forming bacteria, allowing the inoculated medium to remain at incubating temperature for a period, separating bacteria from liquid, and admixing separate bacteria with a flour belonging to the group consisting of cereal and legume flours having a moisture content such that the souring material contains not more than 6% of water.

2. A process for the manufacture of a souring material, which comprises preparing a nutrient medium, inoculating with lactic acid-forming bacteria, allowing the inoculated medium to remain at incubating temperature for a period, separating bacteria from liquid, and admixing separated bacteria with a flour belonging to the group consisting of cereal and legume flours having a moisture content such that the souring material contains not more than 6% of water.

3. A process for the manufacture of a souring material, which comprises preparing a nutrient medium, inoculating with lactic acid-forming bacteria, allowing the inoculated medium to remain at incubating temperature for a period, separating bacteria from liquid, and admixing separated bacteria with a shortening material and a rye flour having a moisture content such that the souring material contains not more than 6% of water.

4. A process for the manufacture of a souring material, which comprises preparing a nutrient medium containing an extract of malt, adjusting the pH value to about 6.0, inoculating with moderate temperature lactic acid-forming bacteria, allowing the medium to remain at a temperature of 20 to 35° C., for a period, separating bacteria from liquid, and admixing separated bacteria with a shortening material and a farinaceous material having a moisture content such that the souring material contains not more than 6% of water.

5. A process for the manufacture of a souring material, which comprises preparing a nutrient medium containing extracts of malt and of malt sprouts, adjusting the pH value to about 6.0, inoculating with moderate temperature lactic acid-forming bacteria, allowing the medium to remain at a temperature of about 30° C. for a period, separating bacteria from liquid, and admixing separated bacteria with a shortening material and a rye flour, said souring material having a moisture content not greater than 6%.

6. A process for the manufacture of a souring material, which comprises preparing a nutrient medium having a Balling of about 2° and containing extracts of malt and malt sprouts, adjusting the pH value to about 6.0, sterilizing, inoculating with moderate temperature lactic acid-forming bacteria, allowing the medium to remain at a temperature of about 30° C. for about 72 hours, separating bacteria from liquid, and then admixing separated bacteria with a hydrogenated oil, a rye flour having a moisture content such that the souring material contains not more than 6% of water and flavor.

7. As a composition of matter a dry souring material comprising moderate temperature lactic acid-forming bacteria substantially free from metabolic products, a shortening material, and a rye flour, said souring material having a moisture content not greater than 6%.

8. As a composition of matter, a dry souring material comprising lactic acid-forming bacteria substantially free from metabolic products and having an incubating temperature of about 30° C., a shortening material, and a rye flour, said souring material having a moisture content not greater than 6%.

9. As a composition of matter a dry souring material comprising acid-forming bacteria substantially free from metabolic products, a shortening material and a flour belonging to the group consisting of cereal and legume flours, said souring material having a moisture content not greater than 6%.

10. As a composition of matter a dry souring material comprising acid-forming bacteria substantially free from metabolic products and a flour belonging to the group consisting of cereal and legume flours, said souring material having a moisture content not greater than 6%.

GEORGE WILLIAM KIRBY.
MARVIN HELMAR RASMUSSON.
STANLEY ADOLPHUS McHUGH.